United States Patent [19]

Hasting et al.

[11] Patent Number: 5,328,633
[45] Date of Patent: Jul. 12, 1994

[54] EXTENDED-RELEASE PLAQUE PREVENTING AND DISSOLVING COMPOSITIONS

[75] Inventors: Michael A. Hasting; Geoffrey A. Lindsay, both of Ridgecrest, Calif.; Michael A. Gustavson, Southworth, Wash.

[73] Assignee: The United States of America as represented by the Secretary of the Navy, Washington, D.C.

[21] Appl. No.: 519,063

[22] Filed: May 4, 1990

[51] Int. Cl.$^5$ ............................................. C02F 5/10
[52] U.S. Cl. ...................................... 252/181; 252/180; 252/82; 252/146
[58] Field of Search ............... 252/180, 181, 174.23, 252/146, 142, 82; 264/109

[56] References Cited

U.S. PATENT DOCUMENTS

| | | | |
|---|---|---|---|
| 3,095,862 | 7/1963 | Berner | 252/180 |
| 3,328,304 | 6/1967 | Globus | 252/180 |
| 4,001,134 | 1/1977 | Markofsky et al. | 252/181 |
| 4,028,239 | 6/1977 | Zinsstag et al. | 252/180 |
| 4,269,723 | 5/1981 | Barford | 252/174.23 |
| 4,480,490 | 7/1984 | Barford et al. | 252/174 |
| 4,612,137 | 9/1986 | Kuroda et al. | 252/142 |
| 4,861,511 | 8/1989 | Kaplan | 252/174.23 |
| 4,895,658 | 1/1990 | Amjad | 252/181 |
| 4,911,859 | 3/1990 | Bunczk et al. | 252/106 |
| 5,043,090 | 8/1991 | Camp et al. | 252/106 |

*Primary Examiner*—Prince Willis, Jr.
*Assistant Examiner*—J. Silbermann
*Attorney, Agent, or Firm*—John L. Forrest, Jr.; Melvin J. Sliwka; Stuart H. Nissim

[57] ABSTRACT

A soluble, extended-release composition containing a benign acidic agent for preventing and dissolving plaque build-up in pipes on board a ship which is not environmentally harmful. The composition can be manufactured into a self-contained, safe to use unit which is easy to dispense, easy to monitor, and leaves no waste product to be manually disposed of.

9 Claims, No Drawings

EXTENDED-RELEASE PLAQUE PREVENTING AND DISSOLVING COMPOSITIONS

BACKGROUND OF THE INVENTION

This invention relates to extended-release compositions and their methods of use. More particularly to salt-water-soluble extended-release tablet compositions containing a benign acidic agent and the method of using the formulation for controlling the plaque build up in water and waste disposal systems.

The prevention of the build up of calcium salts in water pipes has been addressed for many systems, such as hot water heaters. The solution is often to remove the calcium from the water before it enters into the pipes. At sea, saltwater from the ocean is the process water used for ships. It would be impractical and too expensive to remove all of the calcium from sea water to meet the needs of the ship.

One of the most critical problems on board ship is the build up of calcium salts in the pipes of the ship's collection, holding, and transfer system (CHT system) used for waste disposal. Calcium in the seawater reacts with various components in urine, e.g. uric acid and oxalic acid, to form calcium salts which are insoluble in the water used to flush the pipes. These calcium salts form a plaque on the inside surface of the pipes. After a few months, the pipes become severely blocked by the build up of plaque and the system must be cleaned by hydroblasting. The hydroblasting process takes many days and many man hours to complete, and requires that the system be out of commission for that period of time.

A number of different approaches have been tried to alleviate the plaque build-up problem. The Royal Navy attempts to prevent plaque formation in its ships' CHT systems by removing the calcium from the sea water used; this is accomplished with a water softener, e.g., Calgon ® and/or similar products. This method, however, is extremely expensive. The present method used on United States Naval vessels is to add sulfamic acid to the flush water. Maintaining the proper acidity of the fluid in the pipes slows down or prevents the formation of plaque produced by the precipitation of calcium salts.

Sulfamic acid is a low cost solid, however, its use presents many problems. Sulfamic acid is a strong acid and must be handled with extreme care, e.g., use of protective clothing and masks. Presently, the Navy uses perforated plastic bags containing sulfamic acid in shipboard urinals to control the build up of plaque in pipes. When handling the bags, sulfamic acid dust is spread throughout the air and is deposited on anything that comes in contact with the bags. The bag must be placed in a plastic dispenser which is then placed in the urinal. After the sulfamic acid is leached from the bag by the urinal flush water, the old bag must be retrieved from the dispenser, disposed of, and replaced with a new bag. The use of these bags of sulfamic acid: exposes a person to the harmful sulfamic acid dust which may be inhaled or touched; exposes a person to direct contact with the sulfamic acid; and exposes a person to the unhealthy environment of the urinals. Furthermore, it is difficult to observe when the contents of the bag have been depleted of the sulfamic acid because a significant amount of the volume of the bag is composed of insoluble products. All of these inconveniences result in the bags not being replaced often enough to hinder plaque build up in the CHT system. The use of these sulfamic acid bags in their dispensers has also been shown to be marginally effective at controlling plaque build-up because of the erratic pH levels they produce. By example, over a testing period of four days, the use of the sulfamic acid bags in four urinals produced a pH range of 2.0 to 8.5.

The prior art methods are prohibitively expensive, present safety hazards to users, are cumbersome to employ, are difficult to monitor, have been proven to be ineffective, and generate waste which must be manually disposed of and can be environmentally harmful.

One object of this invention is the provision of a method for preventing and dissolving plaque build up.

A still further object of this invention is the provision of a method for preventing and dissolving plaque build up using an extended-release system.

And yet another object of this invention is the provision of a method for preventing and dissolving plaque build up which is not environmentally harmful.

A still further object of this invention is the provision of a method for preventing and dissolving plaque build up which is safe to the user.

A still further object of this invention is the provision of a method for preventing and dissolving plaque build up which is effective and inexpensive to manufacture.

Yet another object of this invention is the provision of a extended-release composition to be used for preventing and dissolving plaque build up.

It is another object of this invention to provide an extended-release composition which is totally salt-water soluble and leaves no waste product to be manually disposed of.

It is yet another object of this invention to provide an extended-release composition which is easy to dispense and easy to monitor.

It is still another object of this invention to provide an extended-release composition which remains effective over a period of one to three days of normal usage.

SUMMARY OF THE INVENTION

The above objects are met by the present invention. According to the invention, an extended-release composition is placed into a system, e.g., a ship's CHT system, where the composition maintains the pH of the system at an acidic state which prevents the precipitation and subsequent build up of a plaque of insoluble salts and which dissolves whatever plaque build up might be already present.

Preferably the composition is placed into the system via a self-contained, extended-release, soluble unit and maintains the pH of the system at an effective acidic level.

A preferred method involves the use of an extended-release composition comprising citric acid, poly(ethylene glycol) (PEG) and poly(ethylene oxide) (PEO), which is formed under pressure into a solid tablet form. The tablet is placed in the bottom of the urinals of a ship where the tablet is slowly dissolved by urine and flush water, releasing the acid therein; thereby, maintaining the pH of the ship's CHT system at the desired acidic level. The method and composition use ingredients which are inexpensive, commercially available, are not environmentally harmful, and are safe and nontoxic to the user.

DETAILED DESCRIPTION OF THE INVENTION AND PREFERRED EMBODIMENTS

As indicated above, plaque build-up can be avoided and in fact reversed by maintaining a sufficiently acidic pH level within a system, e.g., a ship's CHT system or a waste disposal system. An acid environment increases the solubility of the salts that form the plaque; thereby, preventing the precipitation and subsequent build-up of salts and dissolving any plaque build-up already present.

The compositions of this invention provide the means for maintaining a sufficiently acidic level by slowly releasing a benign acidic agent into the system. This is accomplished when the composition, which is comprised of an extended-release binder and a benign acidic agent, is slowly dissolved by fluids, e.g., waste and water, in the system.

In preparing the compositions of this invention, any of a variety of benign acidic agents may be employed as an active agent. As used herein, the term benign acidic agent is employed to designate a mixture of one or more conventional acids which are of a salubrious nature, i.e., safe to handle, safe to the user, innocuous to the elements of the system in which they are used, and unharmful and nontoxic to the environment. By way of example, the following may be mentioned, carbon based acids, such as citric acid, tartaric acid, polyacrylic acid, water soluble copolymers of acrylic acid, poly(maleic anhydride), water soluble copolymers of maleic anhydride, and various mixtures thereof.

In this invention, the quantity of benign acidic agent used may vary depending upon the end use that is contemplated. The size and complexity of the system in which it is used, the frequency and volume of use, the desired rate of release of active agent, and the extended-release binder used are among the factors that will effect the amount of benign acidic agent necessary to maintain the desired pH levels. Preferably an effective range of about 50% to about 95% of benign acidic agent by weight based upon total weight of the composition is used.

The formulation of the extended-release binder, likewise, may be varied to regulate the rate at which the benign acidic agent is released and to alter the working lifetime of the composition. A general formula will be comprised of poly(ethylene glycol) (PEG) and poly(ethylene oxide) (PEO). The PEG constitutes between about 0% to about 30% by weight based on the total weight of the composition. The PEG preferably has an average molecular weight between about 4,000 to about 20,000 gram/mole. The PEO constitutes between about 0% to about 20% by weight based on the total weight of the composition; a preferred range is from about 3% to about 5% by weight. The average molecular weight of the PEO ranges from about 100,000 to about 5,000,000 gram/mole; preferably in the range from about 300,000 to 900,000 gram/mole.

In some applications of the present invention, it may be useful to add sorbitol (also known as d-sorbitol or d-gluditol) as another component in the extended-release binder. Using sorbitol reduces the amount of the more expensive PEG needed and does not alter the effectiveness of the composition of this invention. The amount of sorbitol added may range from about 0% to about 20% by weight; a preferred range is from about 10 weight % to about 12 weight %.

It has been found that it is advantageous to the process of manufacturing tablets of the composition of this invention to incorporate a quantity of anti-sticking (lubricant) agents in the composition of this invention. The amount of lubricant used may be varied dependent upon desired results and environmental and mechanical conditions; a preferred range is from about 0% to about 2% by weight based on the total weight of the composition. Mold or die lubricants commonly known in the art that will affect this purpose without altering the effectiveness or lifetime of the composition of this invention may be employed; preferably the lubricants used are chosen from lubricants which are useable in food products, i.e., non-toxic and safe. These will include, e.g., calcium stearate, magnesium stearate, other non-toxic metal soaps, glycerol fatty esters, fatty acids, and partial glycerol fatty esters.

It has also been found that it is advantageous to both the manufacturing process and the storage life of the composition of this invention to add a moisture absorbing substance. Moisture absorbing substances commonly known in the art that will affect this purpose without altering the effectiveness of the composition of this invention may be employed. These will include, e.g., fumed silica, anhydrous magnesium carbonate, anhydrous magnesium sulfate, anhydrous calcium carbonate, and anhydrous calcium sulfate. The amount of moisture absorbing substance used may be varied depending upon the manufacturing conditions and the contemplated storage conditions. The greater the amount of humidity present the greater amount of moisture absorbing substance required to be effective. At approximately 65° F. and about 30% humidity a preferred range of about 0% to 1% by weight (based on the total weight of the composition) of moisture absorbing substance is used to prevent caking and sticking of the composition during the production process. It is preferred that the total weight of both the lubricant and the moisture absorbing substance together does not exceed one percent by weight.

In some applications it may be useful to include a corrosion inhibitor in the composition of the present invention. Corrosion inhibitors commonly known in the art that will affect this purpose without altering the effectiveness or lifetime of the composition of this invention may be employed. These will include, e.g., the sodium and potassium salts of phosphonates, polyphosphates, sarcosinates and silicates.

Such items as dyes, fragrances, etc. may be incorporated in the composition of this invention to improve the appearance of the products of this invention.

In preferred practice, the composition of this invention is formed into tablets of varying shapes and sizes. The tablets are then placed into a user system, e.g., waste disposal system, CHT system, etc. The ingredients of the composition of this invention are mixed and fed into a tableting machine having at least a 20 ton pressing capacity. The diameter/cross-section of the die, and, therefore, the tablet, remains relatively uniform; however, the height/thickness of the resulting tablet is dependent upon the amount of composition placed in the die and the amount of pressure applied. The amount of compression applied varies with the size of the tablet being formed and with the dissolution rate of the tablet required. The applied pressure range is from about 1,000 pounds per square inch (p.s.i.) to about 20,000 p.s.i of die area. In preferred practice the applied pressure ranges from 4,000 p.s.i. to about 10,000 p.s.i.

Once formed the tablets may be safely stored along with a desiccant in a cool dry environment. A tablet may be placed in the bottom of a urinal and replaced when totally dissolved or shortly before totally dissolving to ensure that the proper pH level is maintained. A large tablet may be placed e.g., within large pipes of a CHT system. Small tablets may be placed in the bottom of a commode to dissolve any plaque build up in the commode disposal pipe. Tablets may also be placed within the water supply system prior to a urinal or commode or other waste or plaque producing fixture.

The following examples are presented to illustrate typical and preferred compositions of the present invention, their methods of manufacture, and their methods of use. The following examples of practice of the invention are understood as being illustrative and are not intended as limitative of the invention.

EXAMPLE 1

An extended-release composition was made by mixing:
75% by weight anhydrous citric acid (Pfizer fine granular, H-2042-10X);
20% by weight poly(ethylene glycol), average molecular weight of 8,000 gram/mole (Union Carbide Carbowax PEG 8000 molecular weight powder); and,
5% by weight poly(ethylene oxide), average molecular weight of 600,000 gram/mole (Union Carbide POLYOX WSR-205).

EXAMPLE 2

Extended-release tablets were manufactured by placing about 100 grams of the composition of Example 1 into a cylindrical die; the composition was then compressed at a pressure of about 10,000 pounds per square inch and formed into tablets averaging 2.5 inches in diameter and 1 inch in height. These tablets were then placed individually at the bottom of one of four urinals on board a United States Navy ship and replaced when totally dissolved. The tablets lasted an average of about 2 days before totally dissolving. The tablets maintained an average pH level within the pipes immediately down stream from the urinals ranging from about 4 to about 7 with a mean pH level maintained at about 5.5

EXAMPLE 3

An extended-release composition was made by mixing:
70% by weight anhydrous citric acid (Pfizer fine granular, H-2042-10X);
20% by weight poly(ethylene glycol), average molecular weight of 8,000 gram/mole (Union Carbide Carbowax PEG 8000 molecular weight powder); and,
10% by weight poly(ethylene oxide), average molecular weight of 600,000 gram/mole (Union Carbide POLYOX WSR-205).

EXAMPLE 4

Extended-release tablets were manufactured by placing about 100 grams of the composition of Example 3 into a cylindrical die; the composition was then compressed at a pressure of about 10,000 pounds per square inch and formed into tablets averaging 2.5 inches in diameter and 1 inch in height. These tablets were then placed individually at the bottom of one of four urinals on board a United States Navy ship and replaced when totally dissolved. The tablets lasted an average of about 2 days before totally dissolving. The tablets maintained an average pH level within the pipes immediately down stream from the urinals ranging from about 4 to about 7 with a mean pH level maintained at about 5.5

EXAMPLE 5

An extended-release composition was made by mixing:
75% by weight anhydrous citric acid (Pfizer fine granular, H-2042-10X);
15% by weight poly(ethylene glycol), average molecular weight of 8,000 gram/mole (Union Carbide Carbowax PEG 8000 molecular weight powder); and,
10% by weight poly(ethylene oxide), average molecular weight of 600,000 gram/mole (Union Carbide POLYOX WSR-205).

EXAMPLE 6

Extended-release tablets were manufactured by placing about 100 grams of the composition of Example 5 into a cylindrical die; the composition was then compressed at a pressure of about 10,000 pounds per square inch and formed into tablets averaging 2.5 inches in diameter and 1 inch in height. These tablets were then placed individually at the bottom of one of four urinals on board a United States Navy ship and replaced when totally dissolved. The tablets lasted an average of about 2 days before totally dissolving. The tablets maintained an average pH level within the pipes immediately down stream from the urinals ranging from about 4 to about 7 with a mean pH level maintained at about 5.5

EXAMPLE 7

An extended-release composition was made by mixing:
75% by weight anhydrous citric acid (Pfizer fine granular, H-2042-10X);
20% by weight poly(ethylene glycol), average molecular weight of 8,000 gram/mole (Union Carbide Carbowax PEG 8000 molecular weight powder); and,
5% by weight poly(ethylene oxide), average molecular weight of 900,000 gram/mole (Union Carbide POLYOX WSR-1105).

EXAMPLE 8

Extended-release tablets were manufactured by placing about 100 grams of the composition of Example 7 into a cylindrical die; the composition was then compressed at a pressure of about 10,000 pounds per square inch and formed into tablets averaging 2.5 inches in diameter and 1 inch in height. These tablets were then placed individually at the bottom of one of four urinals on board a United States Navy ship and replaced when totally dissolved. The tablets lasted an average of about 2 days before totally dissolving. The tablets maintained an average pH level within the pipes immediately down stream from the urinals ranging from about 4 to about 7 with a mean pH level maintained at about 5.5

EXAMPLE 9

An extended-release composition was made by mixing:
75% by weight anhydrous citric acid (Pfizer fine granular, H-2042-10X);
20% by weight poly(ethylene glycol), average molecular weight of 8,000 gram/mole (Union Carbide Carbowax PEG 8000 molecular weight powder); and, 5% by weight poly(ethylene oxide), average molecular weight of 300,000 gram/mole (Union Carbide POLYOX N-750).

EXAMPLE 10

Extended-release tablets were manufactured by placing about 100 grams of the composition of Example 9 into a cylindrical die; the composition was then compressed at a pressure of about 10,000 pounds per square inch and formed into tablets averaging 2.5 inches in diameter and 1 inch in height. These tablets were then placed individually at the bottom of one of four urinals on board a United States Navy ship and replaced when totally dissolved. The tablets lasted an average of about 2 days before totally dissolving. The tablets maintained an average pH level within the pipes immediately down stream from the urinals ranging from about 4 to about 7 with a mean pH level maintained at about 5.5

EXAMPLE 11

An extended-release composition was made by mixing:
70% by weight anhydrous citric acid (Pfizer fine granular, H-2042-10X);
14% by weight poly(ethylene glycol), average molecular weight of 8,000 gram/mole (Union Carbide Carbowax PEG 8000 molecular weight powder);
5% by weight poly(ethylene oxide), average molecular weight of 600,000 gram/mole (Union Carbide POLYOX WSR-205);
10% by weight sorbitol (Pfizer); and,
½% by weight of a mixture comprised of calcium stearate (Whitco) and fumed silica (Cabot Corporation) in approximately a 1 to 1 ratio by weight.

EXAMPLE 12

Extended-release tablets were manufactured by placing about 135 to 155 grams of the composition of Example 11 into a cylindrical die; the composition was then compressed at a pressure of about 5,000 pounds per square inch and formed into tablets averaging 3.0 inches in diameter and 1 inch in height. These tablets were then placed individually at the bottom of one of four urinals on board a United States Navy ship and replaced when totally dissolved. The tablets lasted an average of about 5 days before totally dissolving. The tablets maintained an average pH level within the pipes immediately down stream from the urinals ranging from about 4.0 to about 6.0 with a mean pH level of about 5.5. Occasional spikes due to the flushing of untreated commodes produced pH levels as low as about 2.5 and as high as 6.5; however, the spikes lasted only a few minutes. The pH in the main collection line of the ship's CHT system was lowered from the pH of 8.5 of sea water to a pH of about 8.0 over the 7 day duration of the test.

EXAMPLE 13

An extended-release composition was made by mixing:
70% by weight anhydrous citric acid (Pfizer fine granular, H-2042-10X);
16% by weight poly(ethylene glycol), average molecular weight of 8,000 gram/mole (Union Carbide Carbowax PEG 8000 molecular weight powder);
3% by weight poly(ethylene oxide), average molecular weight of 600,000 gram/mole (Union Carbide POLYOX WSR-205);
10% by weight sorbitol (Pfizer); and,
½% by weight of a mixture comprised of calcium stearate (Whitco) and fumed silica (Cabot Corporation) in approximately a 1 to 1 ratio by weight.

EXAMPLE 14

Extended-release tablets were manufactured by placing about 135 to 155 grams of the composition of Example 13 into a cylindrical die; the composition was then compressed at a pressure of about 5,000 pounds per square inch and formed into tablets averaging 3.0 inches in diameter and 1 inch in height. These tablets were then placed individually at the bottom of one of four urinals on board a United States Navy ship and replaced when totally dissolved. The tablets lasted an average of about 2.5 to 3.5 days before totally dissolving. The tablets maintained an average pH level within the pipes immediately down stream from the urinals ranging from about 2.4 to about 5.5 with a mean pH level of about 4.5. Occasional spikes due to the flushing of untreated commodes produced pH levels as low as about 2.3 and as high as about 6.0; however, the spikes lasted only a few minutes. The pH in the main collection line of the ship's CHT system was lowered from the pH of 8.5 of sea water to an average pH of about 5.0 to about 8.0 and a mean pH level of about 7.2 to about 7.5 with spikes as low as 2.3 and as high as 8.5 over the 7 day duration of the test.

EXAMPLE 15

Individual extended-release tablets of Example 14 were placed in the bottom of 2 blocked urinals. Within 24 hours the drain time of the urinals was decreased from about 25 minutes to about 1 minute.

EXAMPLE 16

Individual extended-release tablets of Example 14 were placed in the bottom of 3 partially blocked urinals. Within 24 hours the drain time of the urinals was decreased from about 4.5 minutes to about 0.5 minutes.

EXAMPLE 17

Individual extended-release tablets of Example 14 were placed in the bottom of 4 urinals and were replaced when totally dissolved. The drain pipe and "P" trap of these urinals were new and free from plaque build up. At the end of 7 days of using the tablets there was no plaque build up on the inside of any of the pipes or traps.

What is claimed is:
1. An extended-release composition for removing and preventing plaque formation, comprising:
50% weight %–95 weight % benign acidic agent; and
5 weight %–50 weight % extended-release binder,
wherein said benign acidic agent is comprised of one or more carbon based acids chosen from the group consisting of citric acid, tartaric acid, and polyacrylic acid, and
wherein said extended release binder is comprised of poly(ethylene glycol) and poly(ethylene oxide).
2. The extended-release composition of claim 1, wherein said benign acidic agent is citric acid.
3. The composition of claim 1 wherein said extended-release binder comprises:
up to 30 weight % (of the total composition) poly(ethylene glycol) with an average molecular weight ranging from about 4,000 to about 20,000 gram/mole; and, up to 20 weight % (of the total composition) poly-(ethylene oxide) with an average molecular weight ranging from about 100,000 to about 5,000,000 gram/mole.

4. The composition of claim 3 wherein said poly(ethylene glycol) has an average molecular weight of about 7000-9000 gram/mole.

5. The composition of claim 3 wherein said poly(ethylene oxide) has an average molecular weight of about 500,000-700,000 gram/mole.

6. An extended-release tablet comprising: the composition of claim 3.

7. The composition of claim 1 further comprising sorbitol up to 20 weight %.

8. An extended release tablet comprising: the composition of claim 7.

9. An extended-release composition for removing and preventing plaque formation, comprising:
50 weight %-95 weight % benign acidic agent; and
5 weight %-50 weight % extended-release binder,
wherein said benign acidic agent is a mixture of one or more carboxylic acids which are of a salubrious nature, being safe to handle, safe to the user, innocuous to the elements of the system in which they are used, and unharmful and nontoxic to the environment, and
wherein said extended release binder is comprised of poly(ethylene glycol) and poly(ethylene oxide).

* * * * *